Figures 1, 2, 3, 4:
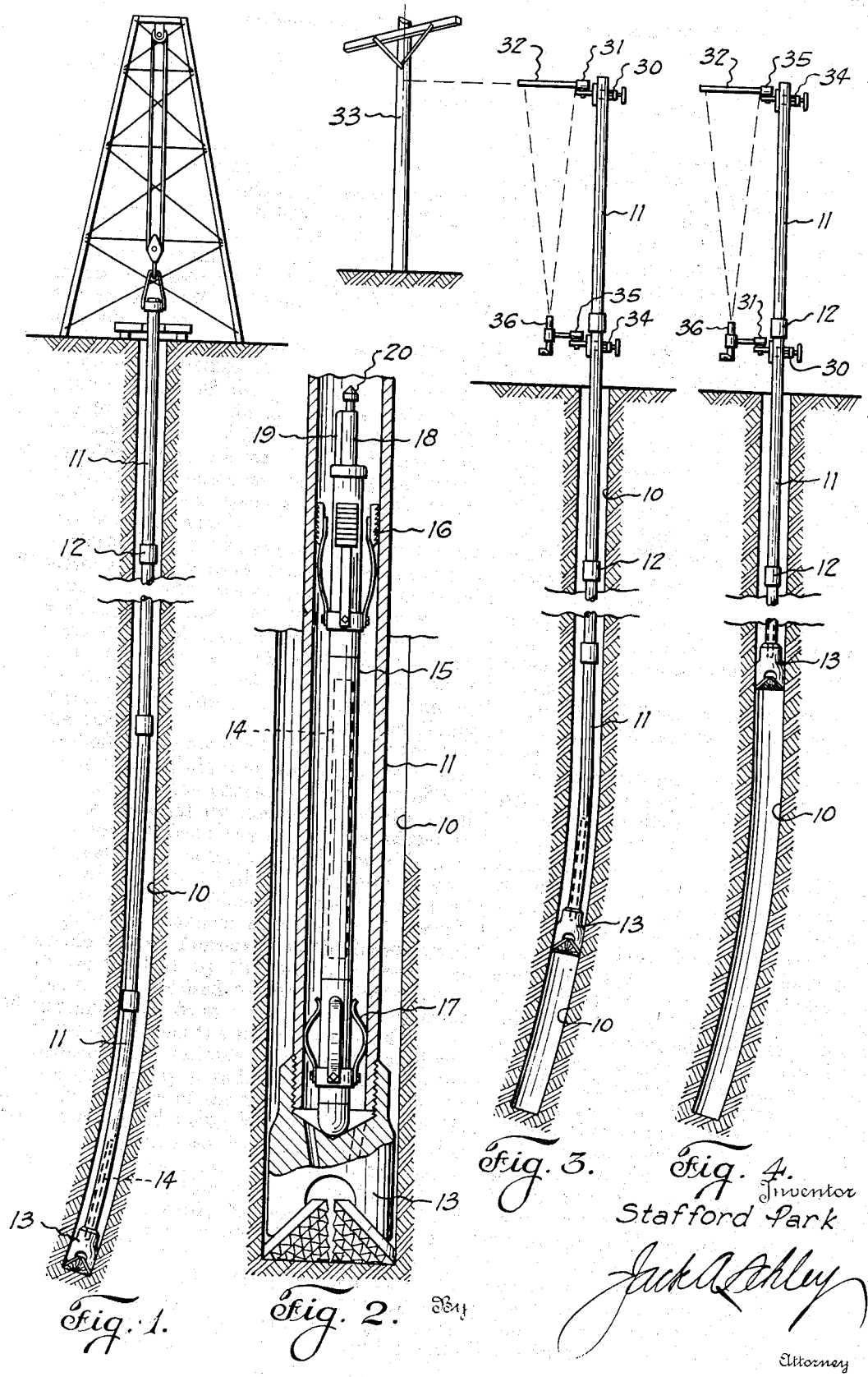

April 4, 1944.   S. PARK   2,345,770
MEANS FOR SURVEYING WELL BORES
Filed Oct. 5, 1940   3 Sheets-Sheet 1

Inventor
Stafford Park

Attorney

April 4, 1944.　　　　　　S. PARK　　　　　　2,345,770
MEANS FOR SURVEYING WELL BORES
Filed Oct. 5, 1940　　　　3 Sheets-Sheet 2

Inventor
Stafford Park

Jack A. Ehley

Attorney

April 4, 1944.                S. PARK                2,345,770
                   MEANS FOR SURVEYING WELL BORES
                      Filed Oct. 5, 1940        3 Sheets-Sheet 3

Inventor
Stafford Park

By Jack A. Ohley

Attorney

Patented Apr. 4, 1944

2,345,770

UNITED STATES PATENT OFFICE 2,345,770

MEANS FOR SURVEYING WELL BORES

Stafford Park, Long Beach, Calif., assignor to Eastman Oil Well Survey Company, Dallas, Tex., a corporation of Delaware, and Eastman Oil Well Survey Corporation, Long Beach, Calif., a corporation of California Application October 5, 1940, Serial No. 359,832

2 Claims. (Cl. 33—205.5)

This invention relates to new and useful improvements in methods of and means for surveying well bores.

Various methods of surveying well bores while the drilling operation is in progress are now in general use and certain of these methods utilize a survey instrument or device which is lowered and raised through the bore by attaching the instrument to the lower end of the drill pipe. In this type of method, it is necessary that the drill pipe be run in and removed from the bore each time readings are to be taken by the instrument and the bore surveyed. Certain other methods contemplate the lowering of the instrument into the drill pipe by means of a line at various intervals but each time the instrument is lowered the drilling operation must be halted until the reading is taken and the instrument removed from the drill pipe. Thus, only a single reading is taken upon each run of the instrument and even though, in these latter methods, withdrawal of the drill pipe is not necessary, considerable time and labor is required to survey the well bore.

It is well known that during drilling operations, the drill pipe or stem must be withdrawn from the bore from time to time in order to change the drill bits and this withdrawal is an ordinary and necessary step in the drilling of wells.

It is one object of this invention to provide an improved method of surveying well bores which method is performed while the drill pipe, tubing or other tubular element is being withdrawn from the hole, whereby said method is carried out without the necessity of running and removing the instrument separately and independently of the drill pipe or tubing, and also whereby the error, due to the torque which is occasioned by forcing the drill pipe downwardly and which occurs when the drill pipe is oriented into the hole, is eliminated.

An important object of the invention is to provide an improved method of surveying wells, wherein the survey instrument is dropped or lowered into the drill pipe and is locked in a fixed position therein and when in such position does not interfere with normal fluid circulation through the pipe, such lowering being just prior to the withdrawal of the pipe, whereby the instrument may be operated as the pipe is withdrawn to make the survey and also whereby the drill pipe is utilized to retrieve the instrument and bring it to the surface, thereby eliminating the necessity of separately withdrawing the instrument.

Another object of the invention is to provide an improved well survey method which includes, orienting the drill pipe out of the hole by maintaining a fixed line along the periphery of the pipe, surveying the well bore at various elevations as the pipe is being withdrawn by means of an instrument locked in a fixed position within the pipe, and then determining the relative position of the instrument with respect to the fixed line to ascertain the azimuthal position of the instrument at the times the indications were made, whereby the direction and deviation of said bore are indicated.

Still another object of the invention is to provide an improved method, of the character described, wherein any well-known method of orienting the drill pipe may be employed in combination with the survey instrument.

A particular object of the invention is to provide an improved survey instrument having a fixed pointer or mark associated with an inclination indicator, together with locking means for locking the device in a drill pipe, whereby the inclination indicator is movable relative to the fixed pointer and to the pipe in which the device is mounted, whereby all indications are made with the various parts in the same relative positions with respect to each other; such arrangement permitting the azimuthal position of the fixed pointer to be readily determined when the instrument reaches the surface, whereby the indications may be quickly and accurately interpreted to obtain the deviation and direction of deviation of the bore.

A still further object of the invention is to provide an improved well survey means, wherein the position of the instrument within the pipe may be determined relative to a known point on said pipe either by mechanical or magnetic means, whereby a minimum amount of time and labor is required for obtaining the information, as shown by the indications on the survey instrument.

Still another object of the invention is to provide an improved method, of the character described, wherein the survey instrument is within the drill pipe only during the removal of the drill pipe, whereby the time that said instrument is exposed to the heat and other conditions in the well bore is minimized to obviate damage to said instrument by such heat or other conditions.

A construction designed to carry out the invention will be hereinafter described, together with other features of the invention.

Figure 5:
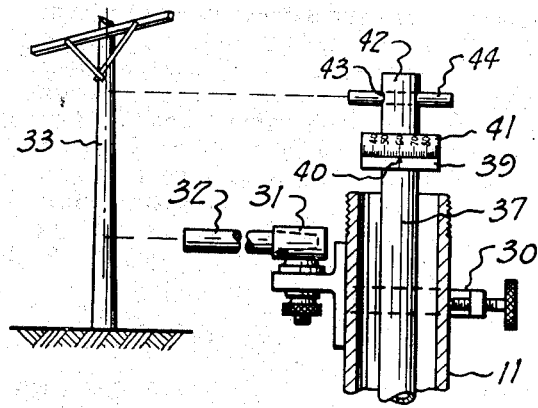
Figure 6:
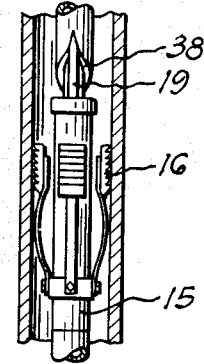
Figure 6:
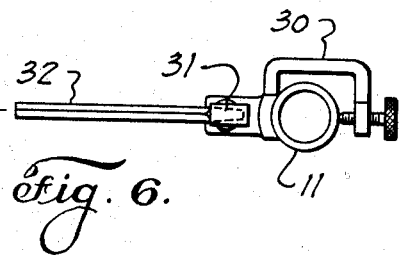
Figure 7:
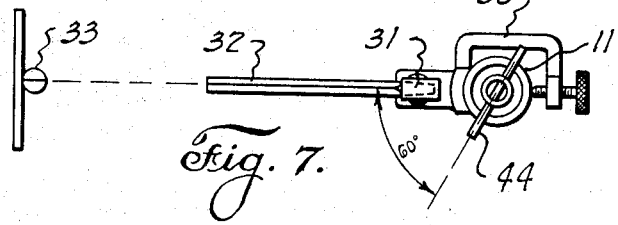
Figure 9:
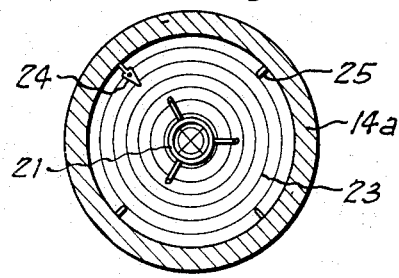
Figure 8:
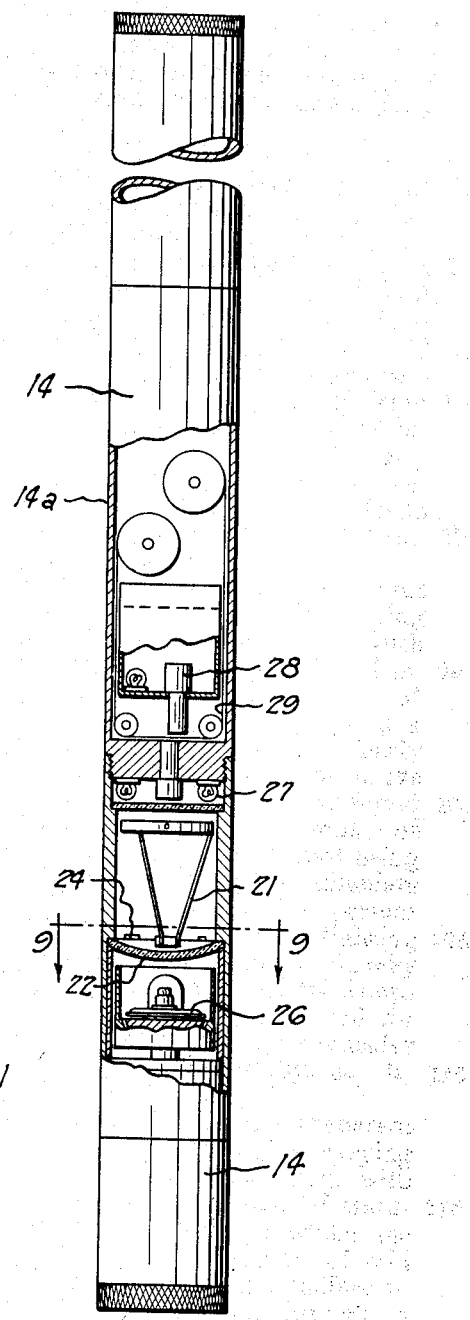
Figure 10:
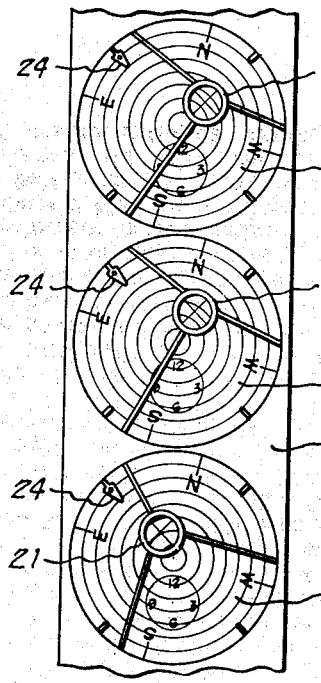
Figure 13:
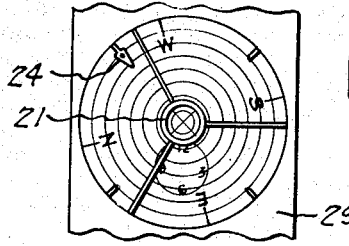
Figure 11:
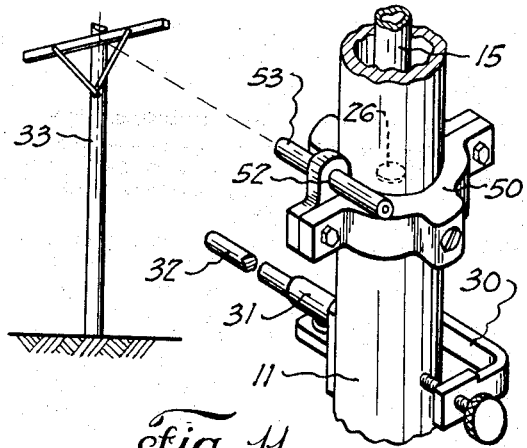
Figure 12:
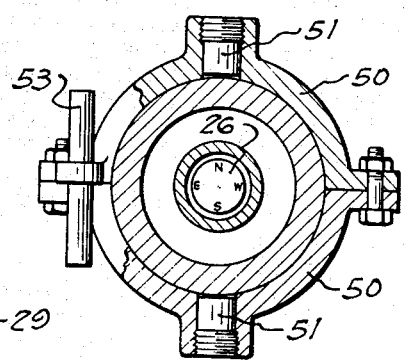
Figure 14:
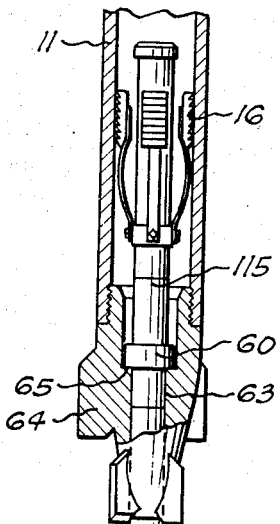
Figure 15:
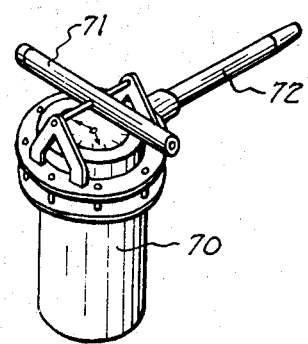

The invention will be more readily understood from a reading of the following specification and by reference to the accompanying drawings, in which an example of the invention is shown, and wherein:

Figure 1 is a vertical, sectional view of a well bore, showing the drill stem or pipe extending therethrough, Figure 2 is an enlarged, transverse, vertical, sectional view of the lower portion of the drill stem, illustrating the well survey instrument mounted therein, Figures 3 and 4 are schematic views, illustrating the steps of orienting the drill pipe or stem out of the well bore, Figure 5 is a transverse, vertical, sectional view of the final steps of the improved method, showing the manner of determining the position of the survey instrument relative to a fixed point on the drill pipe, Figures 6 and 7 are plan views of the drill pipe to further illustrate the method of orienting the pipe out of the well bore and also to determine the relation between the instrument and the predetermined point on said drill pipe, Figure 8 is an enlarged view, partly in elevation and partly in section of the well survey instrument which is used in carrying out the method, Figure 9 is a horizontal, cross-sectional view, taken on the line 9—9 of Figure 8, Figure 10 is an enlarged view of the film, showing three of the photographs which are taken by the surveying instrument, Figure 11 is a view of the drill pipe, showing another method of determining the position of the instrument relative to the fixed or predetermined point on the drill pipe, such method being substituted for that shown in Figure 5, Figure 12 is a horizontal, cross-sectional view, taken through the magnetic collar which is clamped around the drill pipe, as shown in Figure 11, Figure 13 is a view of a portion of film, showing the photograph which is taken at the time the magnetic collar of Figures 11 and 12 is in position on the drill pipe, Figure 14 is a transverse, vertical, sectional view of the lower end of a drill stem, having another type of well survey instrument mounted therein, and Figure 15 is an isometric view of an auto-photo orienter, which is employed for determining the angular difference between clamps during the orienting of the drill pipe out of the well bore.

In the drawings, the numeral 10 designates a well bore which is shown as deviating from the vertical. The drill pipe 11 which includes a plurality of pipe sections which are connected to each other by suitable coupling collars 12 is illustrated in Figure 1 as extending through the well bore 10 and the string of drill pipe has a drill bit 13 connected to its lower end. As is well known, the drill pipe or drill stem 11 is rotated by a suitable rotary table or other means on the derrick floor, whereby the drill bit 13 is rotated to perform the drilling operation. From time to time during the drilling operation, it is necessary that the drill bit 13 be replaced and in order to accomplish such replacement, it is necessary that the entire drill stem or pipe 11 be removed from the well bore 10. Such removal is accomplished by means of elevators and cables in the derrick and the pipe is withdrawn from the bore, section by section.

In carrying out the present invention, a well survey instrument 14 is dropped or lowered downwardly through the drill pipe 11 just prior to the time that said pipe is to be withdrawn from the well bore. This instrument includes an elongate, outer housing 15 which is provided with a gripping slip assembly 16 at its upper end. The lower end of the housing 15 has fixed friction springs 17 thereon for the purpose of axially alining the instrument within the bore of the drill pipe. The extreme upper end of the housing 15 is formed with an upstanding pin 18 which is formed with an elongate, radially extending key or rib 19. The upper end of the pin 18 may be provided with a suitable retrieving connection or fishing neck 20, whereby a suitable tool may be engaged therewith so that lowering of the instrument through the drill pipe may be performed by means of a wire line or cable (not shown). The instrument 14 is lowered or dropped through the drill pipe until its lower end strikes the drill bit 13 which is connected to the bottom of said pipe and, at such time, further downward movement of the instrument is halted. The slip assembly 16 may be of any suitable construction but, as shown, is adapted to engage the wall of the drill pipe so as to prevent upward displacement of the instrument within the pipe. Therefore, the instrument 14 is lowered into the drill pipe and is suitably locked against displacement therein. It is pointed out that the slip assembly 16 not only locks the instrument against an upward movement within the drill pipe but also prevents a rotation of said instrument relative to the pipe.

The particular construction of the survey instrument is subject to variation and several instruments, which are now in general use, may be employed. As illustrated in Figure 8, the instrument includes a plumb bob or inclination indicator 21 which is mounted within the instrument casing 14a so as to undergo a universal movement therein. Manifestly, when the casing is inclined from the vertical, the plumb bob is swung relative to said casing to indicate the angle of inclination. A curved lens 22 is mounted within the casing 14a immediately below the plumb bob and this lens is formed with a plurality of concentric circles 23, each of said circles being representative of one degree, or of a predetermined number of degrees, of inclination. Manifestly, the plumb bob swings relative to the lens 22 and its position with relation to the concentric circles 23 is indicative of the angle of inclination. A fixed pointer 24 is secured to the casing 14a and extends radially and inwardly thereof, as is clearly shown in Figure 9. This pointer is permanently fastened to the casing and maintains the same relative position with respect to the lens 22 at all times. In addition to the pointer 24, inwardly extending lugs 25 may be provided. Since the pointer 24 and lugs 25 are secured to the casing in a fixed position, it is obvious that the plumb bob 21 will swing relative to this pointer in accordance with the angle of inclination and also in accordance with the direction of such inclination.

A compass of any suitable construction is disposed immediately below the lens 22 so that its compass card is visible therethrough. Above the plumb bob, a suitable light source 27 is provided and a photographic camera unit 28 is mounted above the light source. The camera unit includes a travelling film 29 and when said camera is actuated, a photograph of the plumb bob, the lens, the pointer 24, as well as the compass card of the compass 26 is obtained. The camera is controlled by a suitable time mechanism (not shown) which is mounted in the upper end of the instrument casing 14a.

In carrying out the improved method, the instrument 14 is dropped or lowered through the drill pipe 11 so as to come to rest at the bottom of said pipe immediately above the drill bit 13. The instrument is locked against vertical displacement within the pipe and also against a rotative movement therein by means of the slip assembly 16. The instrument is lowered into the pipe just prior to the withdrawal of said pipe from the well bore 10. It is noted that since the drill pipe 11 is metallic, the compass 26 is inactive when the instrument is within said pipe for the metal of said pipe nullifies the action of said compass. The pointer 24 which is secured to the casing 14a immediately above the lens 22 is of course locked in a fixed position with relation to the drill pipe 11 because of the instrument being locked against rotative movement within said pipe. Therefore, during the withdrawal of the pipe upwardly from the well bore, the pointer 24 retains the same relative position with respect to the drill pipe 11 throughout the entire withdrawing operation and this is true regardless of any rotation which the drill pipe may undergo during its upward movement.

Upon being lowered and locked within the drill pipe 11, the instrument 14 is at the same inclination as the drill pipe and since said drill pipe follows the general inclination of the well bore 10, it is obvious that the instrument case 14a is also at such inclination. Due to the universal mounting of the plumb bob 21, said plumb bob will assume a position with relation to the concentric lines 23 on the lens 22, such position indicating the number of degrees of inclination of the casing 14a. Also, the plumb bob 21 will swing relative to the pointer 24, which, as has been explained, is fixed with respect to the drill pipe 11.

The camera unit 28 is, as has been explained, controlled in its actuation by a time mechanism and after the instrument has been lowered into the drill pipe, the camera is operated to photograph the position of the plumb bob 21 relative to the concentric lines 23 of the lens and also relative to the position of the pointer or indicator 24. At this time, the azimuthal position of the pointer, that is, the direction in which said pointer is located, is not known for, obviously, the instrument will assume an unknown position within the drill pipe. However, the photograph will definitely give the relation of the plumb bob to the pointer 24. In order to determine the azimuthal position of the pointer so as to determine the direction of inclination of the bore hole, as indicated by the plumb bob 21, the drill pipe 11 is oriented out of the bore hole 10 as the drill pipe is withdrawn. Such orienting of the drill pipe may be accomplished by any suitable method and it has been found that a method similar to that disclosed in the patent to Stokenbury No. 2,088,539, is suitable. The purpose of the orientation of the drill pipe out of the hole is to maintain a fixed point on the periphery of the drill pipe 11 and since the direction of such fixed point is known, the relation of the fixed point to the indicator 24 may be determined to ascertain the azimuthal position of said pointer.

The orientation of the drill pipe out of the well bore 10 is schematically shown in Figures 3 and 4. The orienting method is carried out by means of a clamp 30 which is adapted to be fastened around the upper end of the uppermost section of drill pipe. This clamp is provided with a socket 31 which is arranged to receive a target bar 32. The target bar 32 is disposed so as to be alined with a fixed object on the horizon, such object being illustrated as a telephone pole 33. Obviously, the direction in which the bar 32 points when alined with the pole 33, may be determined by means of a compass.

After the clamp 30 and bar 32 are properly positioned, a second clamp 34 is secured to the upper end of the next section of drill pipe and this clamp is identical in construction to the clamp 30, being provided with a socket 35. The socket 35 is alined in a vertical plane with the socket 31 of the clamp 30, such alinement being accomplished by inserting a telescope, or other sighting instrument 36 in the socket 35. By so alining the sockets 31 and 35, a point on the pipe 11 is projected and carried downwardly along the periphery of said pipe.

After the sockets 35 and 31 are properly alined, the uppermost clamp 30 is removed and the upper section of drill pipe unscrewed from the remainder of the drill stem. Such removal of the pipe may result in a rotation of the entire drill pipe and to return said pipe to its original position, the target bar 32 is placed in the socket 35 of the clamp 34, as shown in Figure 4. The pipe is then rotated so as to aline the bar 32 with the fixed object 33 on the horizon and thus the fixed point on the pipe 33 is maintained facing in the same direction. After the clamp 34, having the target bar 32 therein, is properly alined in this manner, the clamp 30 is then placed upon the upper end of the next section of drill pipe and the telescope 36 is employed to again aline the clamp. Thus, a predetermined point on the periphery of the pipe is carried along said pipe, being projected from one section to another. This point is constantly maintained facing in a given direction, which direction is of course known to the operator. The clamps 30 and 34 are manipulated each time a section of pipe is removed and the operation is continued until the lowermost section of the drill stem 11 is brought to the surface.

When the lowermost section of drill pipe reaches the surface, one of the clamps is placed around the upper end thereof and the target bar 32 is utilized to locate the predetermined point on the periphery of the pipe in its proper azimuthal position by alining said bar with the fixed object 33. The instrument 14 is utilized to intermittently obtain a photograph of the position of the plumb bob and the timing mechanism of said instrument may be so arranged as to obtain a photograph at various elevations. For example, a photograph could be taken every time that one of the sections of drill pipe is removed or a photograph may be obtained every one hundred feet. Throughout the time that the drill pipe is being removed, the well survey instrument is operating to obtain a plurality of photographs, each of which provides a picture of the location of the plumb bob 21 relative to the concentric lines 23 of the lens 22 and also with respect to the fixed pointer 24.

At the time that the lowermost section of the drill pipe, as shown in Figure 5, is brought to the surface, the exact azimuthal position of the fixed pointer 24 relative to the drill pipe 11 is not known. However, a fixed point on the outer periphery of the drill pipe has been maintained and the azimuthal position or direction of this point is known to the operator. Therefore, it is only necessary to determine the relative position of the point on the drill pipe which has been held through the orienting method, with respect to the fixed indicator 24 in order to determine the azimuthal position of such indicator. When the azimuthal position or the direction of the fixed indicator or pointer 24 has been determined, an examination of the photographs which have been made by the instrument 14 will yield information as to the angle of the deviation, as well as the direction of deviation of the well bore 10.

For determining the relative position of the predetermined point on the drill pipe and the fixed indicator 24, a tubular element 37 is insertable within the lowermost section of drill pipe (Figure 5). This tubular element is provided with a muleshoe 38 on its lower end, which is adapted to coact with the vertically extending key 19 which is provided on the upper end of the housing 15. The muleshoe 38 serves to rotate the element 37 to a predetermined position with relation to the housing 15 and the instrument 14. The vertical key 19 bears a predetermined radial relation to the internal pointer or indicator 24 and, for the purposes of this description, it will be assumed that said indicator is alined or in the same vertical plane as the key 19. Thus, when the tubular element 37 is inserted within the drill pipe and engaged with the key 19, said element is rotated to a predetermined position. In the upper end of the element 37 is carried a disk 39 having an indicating arrow 40 displayed thereon and this arrow is alined with the key 19 and also with the indicator or pointer 24. An indicating scale in the form of a collar or disk 41 is rotatably mounted on the disk 39 and has an upstanding stem 42. The indicating collar 41 is provided with graduations, representative of degrees, while the stem 42 is formed with an opening 43, whereby a telescope 44 is insertable therein.

Manifestly, when the tubular element 37 is moved downwardly into the drill stem and engaged over the key 19, said element is rotated through the coaction of the key with the muleshoe 38, whereby the indicating arrow on the disk 39 is alined with said key. As explained, it is assumed that the key is vertically alined with the pointer 24, whereby the arrow is also alined with said pointer. The telescope 44 is then utilized to sight the fixed object 33 so as to aline said telescope with said object and as the telescope is moved or rotated so as to obtain the proper alinement, the indicating collar 41 is rotated. The telescope is originally in a position with its zero indication opposite the arrow 40 and thus the amount of rotation required to aline the telescope with the object 33 will be definitely indicated by the scale on the collar 41. As shown, the number of degrees so indicated is 60, whereby the arrow 40 is 60° off of the target bar 32 which indicates the point which has been held throughout the orienting method of the drill pipe. Since the arrow 40 is in alinement with the fixed pointer 24, it has been determined that the pointer 24 is 60° off of the point which has been held on the periphery of the drill pipe (Figure 7).

Assuming that the fixed object 33 is disposed in a direction which is true north from the fixed point which has been maintained on the periphery of the drill pipe, it will be manifest that such fixed point faces north. After the telescope 44 has been adjusted and alined with the fixed object and the reading taken on the scale 41, as explained, it follows that the pointer or indicator 24 within the casing 14a of the instrument is located 60° off of true north. Assuming this point to be north 60° west, it will be readily seen that the position of the plumb bob 21 in the various photographs which have been taken may be readily determined to ascertain the direction of inclination of the well bore. Referring to Figure 10, wherein a portion of the photographic film 29 is shown, three photographs are illustrated. The uppermost photograph A indicates the plumb bob off-center of the lens 22. If the indicator or pointer 24 is located at north 60° west, then the direction in which the plumb bob 21 is located is south 30° west. Of course, as the photographs are taken, the time is noted so that the elevation at which each photograph was taken is known.

The second photograph B, which was taken at another elevation, illustrates the plumb bob in a position different from the position shown in photograph A. Since the pipe 11 has been oriented out of the hole and has been maintained in the same relative position with respect to true north, it is evident that the pointer 24 is always in the same direction throughout the entire withdrawal of the drill pipe. Therefore, the pointer 24 is always in a position north 60° west throughout all elevations within the bore. As illustrated in photograph B on the film 29, the plumb bob 21 has moved to a position approximately south 45° west. In photograph C, the plumb bob has moved to a different position which, when compared to the fixed indicator 24, is approximately north 75° west.

From the foregoing, it will be obvious that the various photographs which are taken at the different elevations throughout the well bore may be readily interpreted as soon as the azimuthal position of the fixed pointer 24 has been determined. This azimuthal position is determined at the surface by ascertaining the number of degrees between said pointer and the fixed point which has been held on the periphery of the drill pipe through the orienting method. Thus, the entire well bore may be accurately surveyed without the necessity of removing the drill pipe and then running the instrument into the bore separately of said pipe. Since the instrument is lowered into the pipe just prior to the time that the same is to be removed from the bore, the survey is made during the usual withdrawal operation and the time and labor for the survey is minimized.

Various methods may be employed for determining the relative position of the indicator 24 within the instrument relative to the fixed point which has been held on the pipe as said pipe is withdrawn from the hole. In Figures 1 to 10, this method contemplates the use of the tubular element 37, together with the muleshoe 38 and coacting key 19. Another method of determining the relationship of the indicator or pointer 24 relative to the point maintained on the periphery of the drill pipe through the orienting is illustrated in Figures 11 to 13. In this form of the invention, the drill pipe is oriented out of the hole in exactly the same manner and the various photographs are taken by the instrument 14 at the different elevations. When the last section of drill pipe is brought to the surface, a split clamp 50 is engaged around the drill pipe and is disposed substantially opposite the magnetic compass 26. As explained, the compass does not ordinarily function because it is located within the metallic drill pipe and its compass card does not indicate true north. The split clamp 50 is provided with a pair of diametrically opposed magnets 51 and when the clamp is arranged around the drill pipe, the strength of these magnets is sufficient to cause the compass card to rotate so as to aline the north and south points of said compass with the magnets 51. The clamp 50 is provided with an opening 52 at one side thereof for receiving a telescope 53.

In the operation of this form, the fixed point on the periphery of the drill pipe is alined with the object 33 by means of the target bar 32 and one of the clamps 30 or 34. The clamp 50 is then engaged around the drill pipe so that the magnets 51 may act upon the compass card of the compass 26. The clamp 50 is then rotated so as to aline the magnets 51 with the fixed object 33, such alinement being accomplished by sighting through the telescope 53. When this is done, the clamp is tightened and the instrument is operated to photograph the compass card relative to the pointer 24. Obviously, since the magnets are pointing to the object 33 and the north and south points of said compass are alined with the magnets, the north point of said compass is pointing true north (provided of course that the object 33 is in a northerly direction from the drill pipe). The photograph which is taken at this time is shown in Figure 13 and indicates that the point north on the compass card is 60° from the pointer 24. Since the point north has been directed toward true north, the exact position of the indicator 24 is determined. When this information is obtained, an accurate reading of the various photographs which have been made by the instrument 14 may be obtained.

In Figure 14, a modified form of survey instrument is illustrated. In this form, the interior construction of the instrument is the same and a non-magnetic housing 115 is substituted for the housing 15 of the first form. The housing 115 is provided with an external flange or collar 60 intermediate its ends, while the lower end of said instrument is closed by a plug 61. This plug is provided with a diametrically extending opening 62, which opening is in the same vertical plane or in alinement with the indicator or pointer 24 within said case. The instrument shown in Figure 14 is particularly adapted for use with core bits and is adapted to extend through the bore 63 of such a bit 64. The instrument is supported by means of the collar 60 which rests upon an internal shoulder 65 provided within the bore of the bit 64. The housing 115 has the slip assembly 16 secured to its upper end to prevent upward displacement of the instrument after it is placed in position.

It will be manifest that the lower end of the instrument 14 and housing 115 depends or projects below the bit 64, whereby the compass 26 within said instrument is outside of the drill pipe. When the instrument is used in uncased holes, the compass 26 will function to indicate azimuthal north. When employed in uncased holes, it is not necessary that the pipe 11 be oriented out of the hole for, obviously, each picture will be taken with the compass in a position indicating north and thus the azimuthal position of the plumb bob in the various photographs may be readily determined.

However, there are many instances where a portion of the well bore is cased and, in such instances, the photographs which are made in the uncased part of the hole will indicate the azimuthal position of the plumb bob. Whenever the casing is reached, that is, the drill pipe is moved upwardly into the cased portion of the hole, it is necessary that said pipe be oriented out of the hole and a fixed point maintained on the outer periphery of the pipe, just as in the first form of the invention.

The fixed point which is maintained on the drill pipe is alined or spaced in the direction of the fixed object 33 and it is not essential that the particular direction of said object from the pipe or point thereon be determined. When the last section of drill pipe is brought to the surface, the point on the periphery of the drill pipe is alined with the fixed object 33 and a photograph is taken. After this is done, the pipe is moved upwardly so as to suspend the lower end of the instrument 14 and housing 115 above the derrick floor. A suitable telescope 66 is then inserted within the diametrically extending opening 62 in the plug 61 at the lower end of the housing. The entire section of drill pipe 11, together with the entire instrument and housing 115 is then rotated so as to aline the telescope with the fixed object 33. As explained, the opening 62 is in the same vertical plane as the pointer or indicator 24 within the instrument and, therefore, such rotation of the pipe and instrument causes the pointer 24 to be alined or facing in the direction of the object 33. At this time, another photograph is taken and, obviously, by comparing such photograph with the last-named photograph, the number of degrees difference between the point maintained on the periphery of the drill pipe and the fixed pointer 24 may be readily determined. The exact azimuthal position of the pointer will, of course, be obvious by observing the last photograph and locating the pointer with respect to true north as indicated by the compass 26.

The pipe 11 has been described as oriented out of the well bore 10 by maintaining a fixed point on the periphery of said pipe and by maintaining this point facing in a given or predetermined direction throughout the withdrawal operation. In other words, each time one of the clamps 30 or 34 are set on said pipe and the target bar 32 mounted therein, the pipe is rotated so as to direct the bar toward the fixed object 33. It is not necessary in the orienting method that the pipe be rotated in this manner so as to at all times maintain the fixed point on the periphery of the pipe facing in a given direction. In place of this manual rotation of the pipe each time that the clamp is fixed, an auto-photo orienter 70 may be employed. The orienter 70, as shown in Figure 15, is a standard instrument which is now in general use and includes a telescope 71 as well as a supporting bar 72 which is insertable within the sockets of the clamps 30 and 34. In using the orienter, the uppermost clamp 30, as shown in Figure 3, is first alined with the target in the manner hereinabove set forth. The lower clamp 34 is then placed in position on the next section of drill pipe and is properly alined with the upper clamp 30. The uppermost pipe section is then broken off and removed and during the breaking out of the joint, the remainder of the drill pipe below the clamp 34 may be rotated. Instead of rotating the pipe back to a position alining the clamp 34 with the fixed object 33, it is only necessary to place the orienter 70 in position on the clamp, that is, the bar 72 is inserted into the socket of said clamp. The telescope 71 is then alined with the fixed object 33 and the orienting instrument 70 takes a photograph to show the number of degrees between the position of the socket of the clamp 34 and the fixed object 33, whereby the point which is maintained on the drill pipe relative to the fixed object 33 is shown in degrees. The next clamp is then placed on the drill pipe and is alined with the clamp 34, after which the uppermost section of drill pipe is removed. The operation is then repeated and each time there is a possibility of rotation on the drill pipe, the orienter 70 is employed to show or indicate in degrees the difference between this object 33 and the point which is being maintained on the periphery of the drill pipe. The orienter 70 includes a clock mechanism whereby the time that the indication is made is also shown so that said time may be compared with the time that the various photographs taken within the well bore by the survey instrument may be made. In this manner, the point on the periphery on the drill pipe is maintained and its position relative to the fixed object 33 is known at all times. The use of the orienter 70 eliminates the necessity of constantly rotating the drill pipe 11 so as to maintain the point on said drill pipe in alinement or facing the fixed object 33.

It is pointed out that in the methods disclosed herein, the drill pipe is oriented out of the well bore, that is, while the same is being pulled upwardly and therefore errors which are due to torque are greatly reduced, as compared to methods where the pipe is oriented as it is lowered into the bore. When being lowered, the weight of the pipe is imposed on the string whereby errors due to torque result and these errors are minimized during raising or lifting the spring. Further, the survey instrument is not lowered with the drill pipe but is dropped or lowered therethrough into proper position just prior to removal of the pipe and commencement of the survey. With this arrangement, the instrument is subjected to the heat within the well bore for a minimum length of time, whereby danger of damage to the instrument by this heat is substantially avoided.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. An apparatus for surveying well bores including, a drill pipe, a survey instrument having a fixed indicator therein arranged to be lowered in the drill pipe, means for locking the instrument against rotation within the drill pipe whereby the record of the direction of inclination of the instrument is made relative to the fixed indicator, means at the surface for orienting the pipe out of the hole to establish a fixed azimuthal point on the periphery of the pipe, said survey instrument being actuated during withdrawal of the pipe to make a plurality of records at various elevations in the well bore, a magnetic compass within the instrument, and magnetic means adapted to encircle the drill pipe and instrument when these parts are brought to the surface, whereby a record of the position of the indicator relative to azimuth may be made to determine the azimuthal position of said indicator.

2. An apparatus for surveying well bores including, a pipe extending through the well bore, a well survey instrument adapted to be lowered into the bore, said instrument including a plumb bob for indicating degree and direction of inclination, a circular element below the plumb bob, a fixed indicator adjacent the periphery of the element, and a photographic unit for photographing the position of the plumb bob relative to the element and indicator to make a record of the degree and direction of inclination, means for locking the instrument in the pipe to locate the indicator in a fixed position with respect to the periphery of the pipe, means for establishing an imaginary line in a predetermined plane and azimuth on the periphery of the pipe as said pipe is withdrawn from the bore, the survey instrument being actuated as the pipe is withdrawn to make records at various elevations in the well bore, a magnetic compass within the instrument below the circular element and indicator and arranged to be photographed therewith, and means at the surface for causing the compass to assume a predetermined position, whereby a photographic record of the position of the indicator with respect to the compass may be made to ascertain the position of the indicator relative to the established line on the periphery of the pipe, thus making possible the determination of the azimuthal position of said indicator and interpretation of the records to ascertain the direction of inclination of the well bore.

STAFFORD PARK.